(12) United States Patent
Hattori

(10) Patent No.: US 11,325,658 B2
(45) Date of Patent: May 10, 2022

(54) FRAME JOINT

(71) Applicant: HONDA MOTOR CO., LTD., Tokyo (JP)

(72) Inventor: Katsutaka Hattori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 447 days.

(21) Appl. No.: 16/575,691

(22) Filed: Sep. 19, 2019

(65) Prior Publication Data

US 2020/0102022 A1 Apr. 2, 2020

(30) Foreign Application Priority Data

Sep. 28, 2018 (JP) .............................. JP2018-185466

(51) Int. Cl.
*B62D 27/06* (2006.01)
*F16B 5/02* (2006.01)

(52) U.S. Cl.
CPC .............. *B62D 27/065* (2013.01); *F16B 5/02* (2013.01)

(58) Field of Classification Search
CPC ......... B62D 23/005; F16B 5/02; F16B 5/0642
See application file for complete search history.

(56) References Cited

U.S. PATENT DOCUMENTS

| 8,640,814 | B2 | 2/2014 | Deckard et al. | |
| 2012/0049476 | A1* | 3/2012 | Querro | B62K 19/18 280/87.041 |
| 2019/0131917 | A1* | 5/2019 | Tomolillo | F24S 25/00 |

FOREIGN PATENT DOCUMENTS

JP S60-67285 4/1985

* cited by examiner

*Primary Examiner* — Jason L Vaughan
*Assistant Examiner* — Amanda Kreiling
(74) *Attorney, Agent, or Firm* — Rankin, Hill & Clark LLP

(57) ABSTRACT

A frame joint connecting connection portions to each other, the connection portions being arranged in frame members of a vehicle, includes an inner peripheral wall including abutment surfaces, the abutment surfaces being arranged in the one connection portion and crossing with each other in the radial direction, tapered surfaces being arranged in the other connection portion and facing the inner peripheral wall, an expansion collar movable in the radial direction so as to abut on the inner peripheral wall, and a fastener keeping fitting of the expansion collar in a state where the expansion collar abuts on the inner peripheral wall.

8 Claims, 16 Drawing Sheets

FRAME JOINT

INCORPORATION BY REFERENCE

The present application claims priority under 35 U.S.C. § 119 to Japanese Patent Application No. 2018-185466 filed on Sep. 28, 2018. The content of the application is incorporated herein by reference in its entirety.

TECHNICAL FIELD

The present invention relates to a frame joint.

BACKGROUND ART

Conventionally, there is known a technology in which a body frame is formed of a hollow pipe, a fitting portion of a projection and a recess is arranged in a connection joint that is fixed to the hollow pipe, and the fitting portion is fastened and joined by a screwing means in a state of being fit by the projection and recess shape (refer to Patent Literatures 1 and 2 for example).

In Patent Literature 1, there is described a body frame of a two wheeled vehicle of a saddle riding type. In Patent Literature 1, front and rear body frames are joined to each other by left and right joint portions, plural number of projection and recess portions are arranged in a trapezoidal shape in the left and right joint portions and are fastened and fixed by plural number of bolts, the plural number of projection and recess portions being fit to each other in the longitudinal direction.

In Patent Literature 2, there is described a body frame of an S×S (side by side) four wheeled vehicle. In Patent Literature 2, projections and recesses having a conical shape are arranged by plural numbers in a joint portion of a body frame and are fastened and joined by bolt holes arranged within the projection and recess portions, the projections and recesses being fit to each other.

CITATION LIST

Patent Literature

[Patent Literature 1] JP-A No. S60-67285
[Patent Literature 2] U.S. Pat. No. 8,640,814

SUMMARY OF INVENTION

Technical Problem

According to Patent Literature 1, since the area of the fitting surface of the projection and recess portion is large, high working accuracy is required in order to prevent occurrence of chattering.

According to Patent Literature 2, high working accuracy is required in order to evenly fit plural number of the projections and recesses.

Thus, in the frame joints according to prior arts, since plural number of projection and recess fitting portions are provided, high working accuracy is required, and the cost increases.

The present invention has been achieved in view of such circumstances as described above, and its object is to provide a frame joint for a highly rigid vehicle and the like where accuracy is hardly required.

Solution to Problem

In a frame joint connecting connection portions (80, 90, 680, 690, 780, 790) to each other, the connection portions (80, 90, 680, 690, 780, 790) being arranged in frame members (51, 63) of a vehicle, the frame joint is featured to include: an inner peripheral wall (85) including wall surfaces (85a) arranged in the one connection portion (80, 680, 780) and crossing with each other in the radial direction; tapered surfaces (95a) arranged in the other connection portion (90, 690, 790) and facing the inner peripheral wall (85); an expansion collar (100, 200, 300, 500) movable in a radial direction so as to abut on the inner peripheral wall (85); and a fastener (110, 120) keeping fitting of the expansion collar (100, 200, 300, 500) in a state where the expansion collar (100, 200, 300, 500) abuts on the inner peripheral wall (85).

In the configuration described above, it is also possible that the inner peripheral walls (85) are arranged at least by a pair, and the expansion collar (100, 200, 300, 500) is disposed so as to face the pair of inner peripheral walls (85) and has a shape of abutting on the wall surfaces (85a) in a surface-contact state.

Also, in the configuration described above, it is also possible that the frame members (51, 63) are tubular bodies including hollow spaces (51b, 61b) in an inside, and the connection portions (80, 90, 680, 690, 780, 790) are formed separately from the frame members (51, 63) and includes leg portions (81a, 91a) inserted to the hollow spaces (51b, 61b) of the frame members (51, 63).

Also, in the configuration described above, it is also possible that a projected portion (93) and a recessed portion (83) are arranged in the connection portions (80, 90) so as to face each other, the projected portion (93) including the tapered surfaces (95a), the recessed portion (83) receiving the projected portion (93), the inner peripheral wall (85) is formed in the recessed portion (83), and a fastening hole (96) is disposed at a center portion of the projected portion (93), the fastener (110) being inserted to the fastening hole (96).

Also, in the configuration described above, it is also possible that a projected portion (93) and a recessed portion (83) are arranged in the connecting connection portions (680, 690, 780, 790) so as to face each other, the projected portion (93) including the tapered surfaces (95a), the recessed portion (83) receiving the projected portion (93), the inner peripheral wall (85) is formed in the recessed portion (83), and fastening holes (686, 786) are disposed outside the inner peripheral wall (85) so as to sandwich the recessed portion (83), a pair of fasteners (110) being inserted to the fastening holes (686, 786).

Also, in the configuration described above, it is also possible that the expansion collar (200) is configured with a plurality of split bodies (201), and is formed by connecting the split bodies (201) by an elastic body (202).

Also, in the configuration described above, it is also possible that the expansion collar (300, 500) is configured with a plurality of split bodies (301, 501), a resilient section (330, 430, 530) is arranged on a fastening direction side end surface (104) of the expansion collar (300, 500), the resilient section (330, 430, 530) being capable of transmitting an overall energizing force to each of split bodies (301, 501), and the expansion collar (300, 500) is energized to an insertion side of the tapered surfaces (95a).

Also, in the configuration described above, it is also possible that the resilient section (330) is arranged so that a plurality of arc-shape plate spring portions (331) continue in the peripheral direction, the arc-shape plate spring portion (331) including an open space (332), and the open space (332) deforms by a force applied to the arc-shape plate spring portion (331), and a resilient force can transmit to the adjacent arc-shape plate spring portion (331).

Advantageous Effects of Invention

A frame joint connecting connection portions to each other, the connection portions being arranged in frame members of a vehicle, includes an inner peripheral wall including wall surfaces, the wall surfaces being arranged in the one connection portion and crossing with each other in the radial direction, tapered surfaces arranged in the other connection portion and facing the inner peripheral wall, an expansion collar movable in the radial direction so as to abut on the inner peripheral wall, and a fastener keeping fitting of the expansion collar in a state where the expansion collar abuts on the inner peripheral wall. With this configuration, fitting of the expansion collar can be kept in a state where the expansion collar is moved in the radial direction and is made to abut on the inner peripheral wall, the rigidity of the fitting portion can be improved, it is not required to increase the number of pieces of the fastener, and assembling can be simplified.

In the configuration described above, it is also possible that the inner peripheral walls are arranged at least by a pair, and that the expansion collar is disposed so as to face the pair of inner peripheral walls and has a shape of abutting on the wall surfaces in a surface-contact state. With this configuration, since abutting is effected in a surface-contact state by the pair of inner peripheral walls facing the expansion collars, bending rigidity around the axis of the fastener of the joint portion can be improved.

Also, in the configuration described above, it is also possible that the frame members are tubular bodies including hollow spaces in the inside, and the connection portions are formed separately from the frame members and includes leg portions inserted to the hollow spaces of the frame members. With this configuration, since the connection portions are formed separately from the frames and include the leg portions inserted to the hollow spaces of the frames formed of tubular bodies, both of improvement of the rigidity of the pipes and the degree of freedom of the shape of the connection portion can be achieved.

Also, in the configuration described above, it is also possible that a projected portion and a recessed portion are arranged in the connecting connection portions so as to face each other, the projected portion including the tapered surface, the recessed portion receiving the projected portion, the inner peripheral wall is formed in the recessed portion, and a fastening hole is disposed at the center portion of the projected portion, the fastener being inserted to the fastening hole. With this configuration, since the fastener is inserted at the generally center portion of the recessed portion including the inner peripheral wall fitting into the projected portion through the expansion collar, the projected portion including the tapered surface, a fastening force of the fastener can be transmitted evenly to each expansion collar, and assembling workability improves.

Also, in the configuration described above, it is also possible that a projected portion and a recessed portion are arranged in the connecting connection portions so as to face each other, the projected portion including the tapered surface, the recessed portion receiving the projected portion, the inner peripheral wall is formed in the recessed portion, and fastening holes are disposed outside the inner peripheral wall so as to sandwich the recessed portion, a pair of fasteners being inserted to the fastening holes. With this configuration, since the pair of fasteners are disposed outside the inner peripheral wall so as to sandwich the recessed portion including the inner peripheral wall fitting into the projected portion through the expansion collar, the projected portion including the tapered surface, the fitting stress of the expansion collar can be increased.

Also, in the configuration described above, it is also possible that the expansion collar is configured with a plurality of split bodies, and is formed by connecting the split bodies by an elastic body. With this configuration, since plural number of the split bodies of the expansion collar can be assembled collectively, assembling workability improves.

Also, in the configuration described above, it is also possible that the expansion collar is configured with a plurality of split bodies, a resilient section is arranged on a fastening direction side end surface of the expansion collar, the resilient section being capable of transmitting an overall energizing force to each of split bodies, and the expansion collar is energized to the insertion side of the tapered surface. With this configuration, since the fitting timing of plural number of the split bodies of the expansion collar can be synchronized between the adjacent split bodies of the expansion collar, fitting quality improves.

Also, in the configuration described above, it is also possible that the resilient section is arranged so that a plurality of arc-shape plate spring portions continue in the peripheral direction, the arc-shape plate spring portion including an open space, and the open space deforms by a force applied to the arc-shape plate spring portion, and a resilient force can transmit to the adjacent arc-shape plate spring portion. With this configuration, since the resilient force is propagated to the adjacent arc-shape plate spring portion by deformation of the open space of the time when the arc-shape plate spring portion including the open space is compressed, dispersion of the fitting timing of the expansion collar can be reduced.

DESCRIPTION OF EMBODIMENTS

Figure 1:
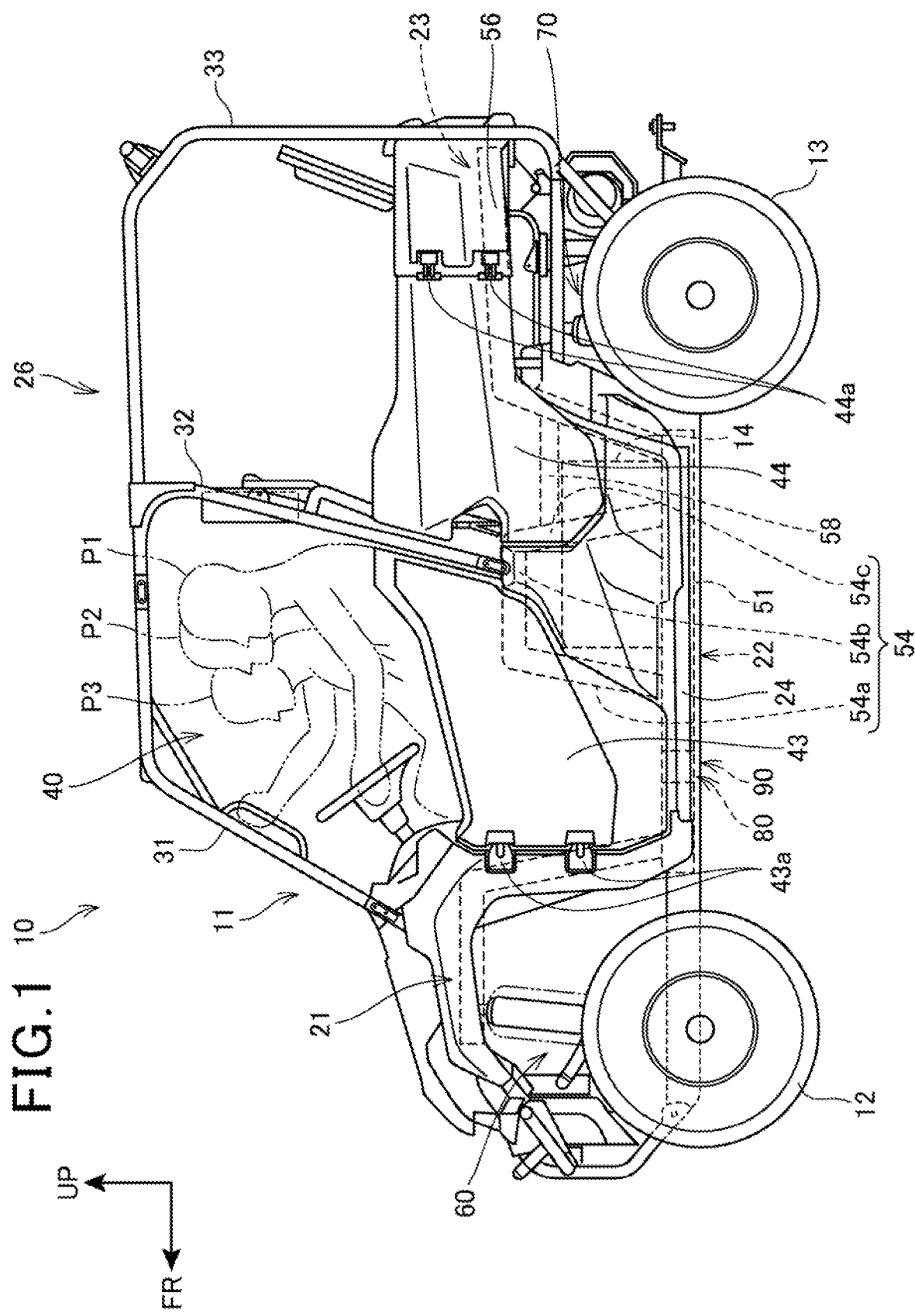
FIG. 1 is a left side view that shows an all terrain vehicle of an embodiment of the present invention.

Hereinafter, embodiments of the present invention will be explained referring to the drawings. Also, in the explanation, description of the direction such as the front, rear, left, right, top, and bottom is the same as the direction with respect to the vehicle body unless stated otherwise in particular. Further, the reference sign FR shown in each drawing expresses a front side of the vehicle body, the reference sign UP expresses an upper side of the vehicle body, and the reference sign LH expresses a left side of the vehicle body.

First Embodiment

FIG. 1 is a left side view that shows an all terrain vehicle 10 of the first embodiment of the present invention.

The all terrain vehicle 10 includes a body frame 11, a pair of left and right front wheels 12, and a pair of left and right rear wheels 13, the body frame 11 becoming a framework, the front wheels 12 being supported by the front portion of the body frame 11, the rear wheels 13 being supported by the rear portion of the body frame 11. The all terrain vehicle 10 is an MUV (Multi-Utility Vehicle) traveling with a driving force being supplied to the front wheels 12 and the rear wheels 13 by an engine 14 disposed at the lower portion close to the vehicle rear. The all terrain vehicle 10 is an MUV of so-called side-by-side type in which three occupants P1, P2, P3 including a driver P1 get on side by side in the vehicle width direction on a seat on the front side. On the rear side of the all terrain vehicle 10, two occupants (occupants on the rear side are not illustrated in FIG. 1) can get on using an auxiliary seat.

The body frame 11 includes a front frame 21, a center frame (main frame) 22, and a rear frame 23, the center frame 22 being connected to the rear portion of the front frame 21, the rear frame 23 being connected to the rear portion of the center frame 22. Also, the body frame 11 includes a pair of left and right side frames 24 and an upper frame 26, the side frames 24 being attached to the side portions of the center frame 22, the upper frame 26 being attached so as to extend upward from the front frame 21, the side frames 24, and the rear frame 23.

By the front frame 21, the front wheels 12 are supported through front suspensions 60.

By the rear frame 23, the rear wheels 13 are supported through rear suspensions 70.

The upper frame 26 includes a pair of left and right front pillars 31, a pair of left and right center pillars 32, and a pair of left and right rear pillars 33, the front pillars 31 extending upward and obliquely rearward from the rear upper portion of the front frame 21, the center pillars 32 extending upward and obliquely rearward from the center portion in the vehicle longitudinal direction of the side frames not illustrated, the rear pillars 33 extending upward from the rear end portion of the rear frame 23. The left and right front pillars 31, the left and right center pillars 32, and the left and right rear pillars 33 are connected respectively by cross pipes not illustrated.

A space surrounded by the front frame 21, the side frames, and the upper frame 26 forms a cabin 40, the occupants getting on the cabin 40.

In the cabin 40, a front seat not illustrated is disposed between the front pillars 31 and the center pillars 32 and a pair of left and right front doors 43 are arranged, the front doors 43 being opened/closed by front hinge mechanisms 43a. Also, between the center pillars 32 and the rear pillars 34, a pair of left and right rear doors 44 are arranged, the rear doors 44 being opened/closed by rear hinge mechanisms 44a. Between the front doors 43 and the upper frame 26 and between the rear doors 44 and the upper frame 26, it is possible to stretch side belts not illustrated in a polygonal shape so as to narrow openings of the lateral sides of the occupants. By stretching a net member in a portion surrounded by the side belts, it is possible to prevent a piece of wood, stone, and the like from entering the cabin 40 and to prevent a cargo from dropping vehicle outward from the cabin 40 and so on.

Figure 2:
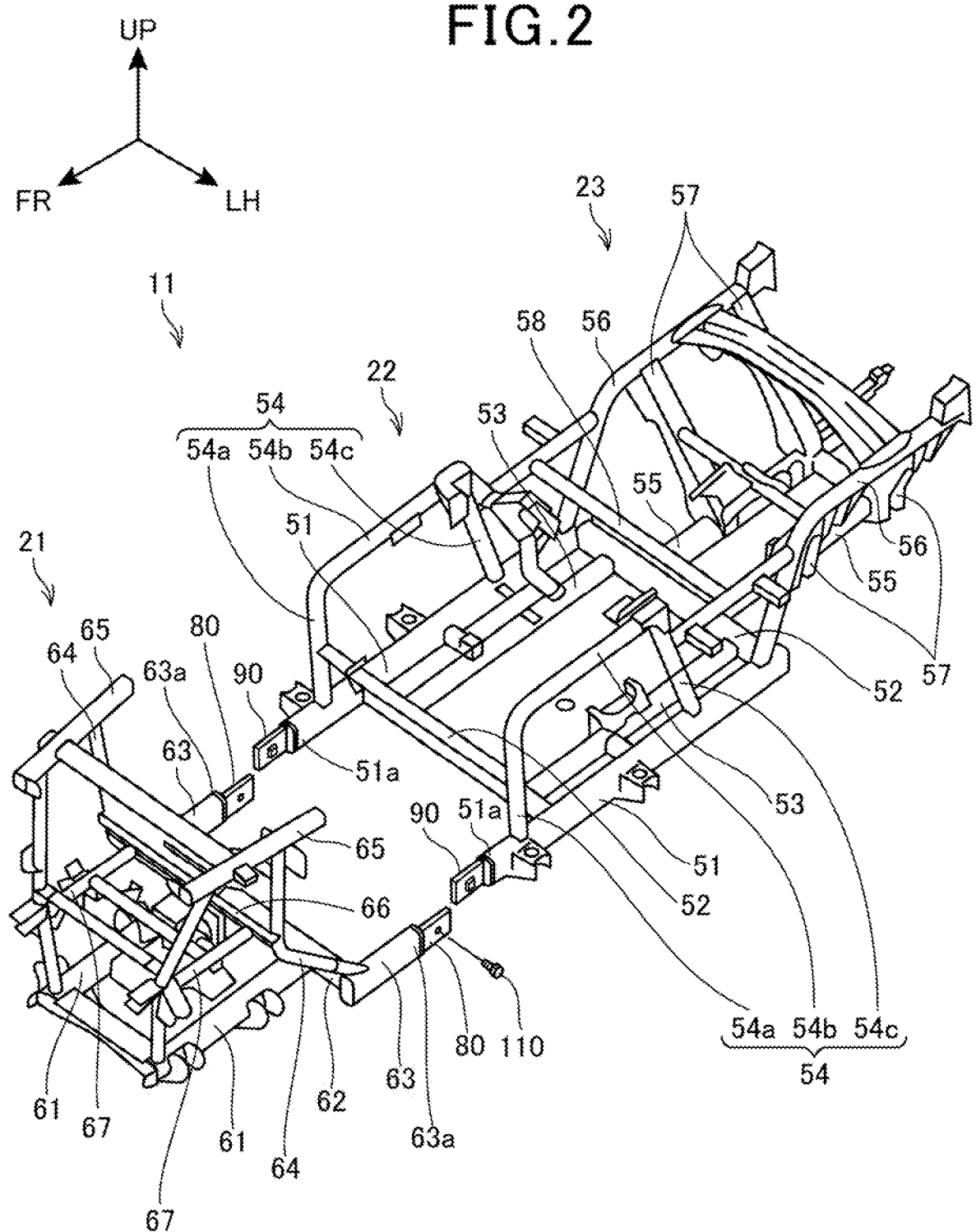
FIG. 2 is an exploded perspective view of a body frame of the all terrain vehicle.

FIG. 2 is an exploded perspective view of the body frame 11 of the all terrain vehicle 10.

By segmenting the body frame 11 into components of the front frame 21, the center frame 22, the rear frame 23, and the like, production processes of welding, painting, and the like are made efficient.

According to the present embodiment, the front frame 21 and the center frame 22 are segmented into components, and the front frame 21 and the center frame 22 are jointed to each other.

The center frame 22 includes a pair of left and right center lower frames 51 extending in the vehicle longitudinal direction. A connection portion 90 is fixed to the front end of the center lower frame 51. To the center lower frames 51, a pair of front and rear cross frames 52, 52 are connected, the cross frames 52, 52 extending in the vehicle width direction. A pair of left and right reinforcing lower frames 53, 53 connect the cross frames 52, 52 to each other, the reinforcing lower frames 53, 53 extending in the vehicle longitudinal direction.

To each of the center lower frames 51, a center upper frame 54 is connected. The center upper frame 54 is formed into an inverted U-shape. The center upper frame 54 includes a standing portion 54a, an upper portion 54b, and a rearward descending portion 54c, the standing portion 54a standing upward, the upper portion 54b extending rearward from the upper end of the standing portion 54a, the rearward descending portion 54c inclining downward to the rear from the rear end of the upper portion 54b.

To the rear portion of the center frame 22, the rear frame 23 is connected.

The rear frame 23 includes a pair of left and right rear lower frames 55, a pair of left and right rear upper frames 56, a rear standing portion 57, and so on, the rear lower frames 55 being connected to the center portion in the vehicle width direction of the cross frame 52 on the rear side and extending rearward, the rear upper frames 56 standing upward from the rear portion of the center lower frame 51 and extending rearward, the rear standing portion 57 connecting the rear lower frames 55 and the rear upper frames 56 to each other. By the rear lower frames 55 and the rear upper frames 56, the rear wheels 13 are supported through the rear suspensions 70 (refer to FIG. 1).

A connection frame 58 having an H-shape connects the rearward descending portions 54c of the center upper frames 54 and the rear upper frames 56 to each other.

The front frame 21 includes a pair of left and right front lower frames 61 extending in the vehicle longitudinal direction. A front lower cross portion 62 connects the rear end portions of the front lower frames 61 to each other, the front lower cross portion 62 extending in the vehicle width direction. To both ends of the front lower cross portion 62, a pair of left and right connection lower frames 63 are connected, the connection lower frames 63 extending rearward. To the rear end portions of the connection lower frames 63, connection portions 80 are fixed.

To the front end portions of the connection lower frames 63, a pair of left and right down frame portions 64 having an L-shape are connected, the down frame portions 64 extending inward in the vehicle width direction and extending upward. To the upper ends of the down frame portions 64, a pair of left and right cushion support frames 65 are connected, the cushion support frames 65 extending in the vehicle longitudinal direction. To the center portions in the vertical direction of the down frame portions 64, a pair of left and right front upper frames 67 are connected through a cross pipe 66 extending in the vehicle width direction, the front upper frames 67 extending forward. By the front lower frames 61, the front upper frames 67, and the cushion support frames 65, the front wheels 12 are supported through the front suspensions 60 (refer to FIG. 1).

Figure 3:
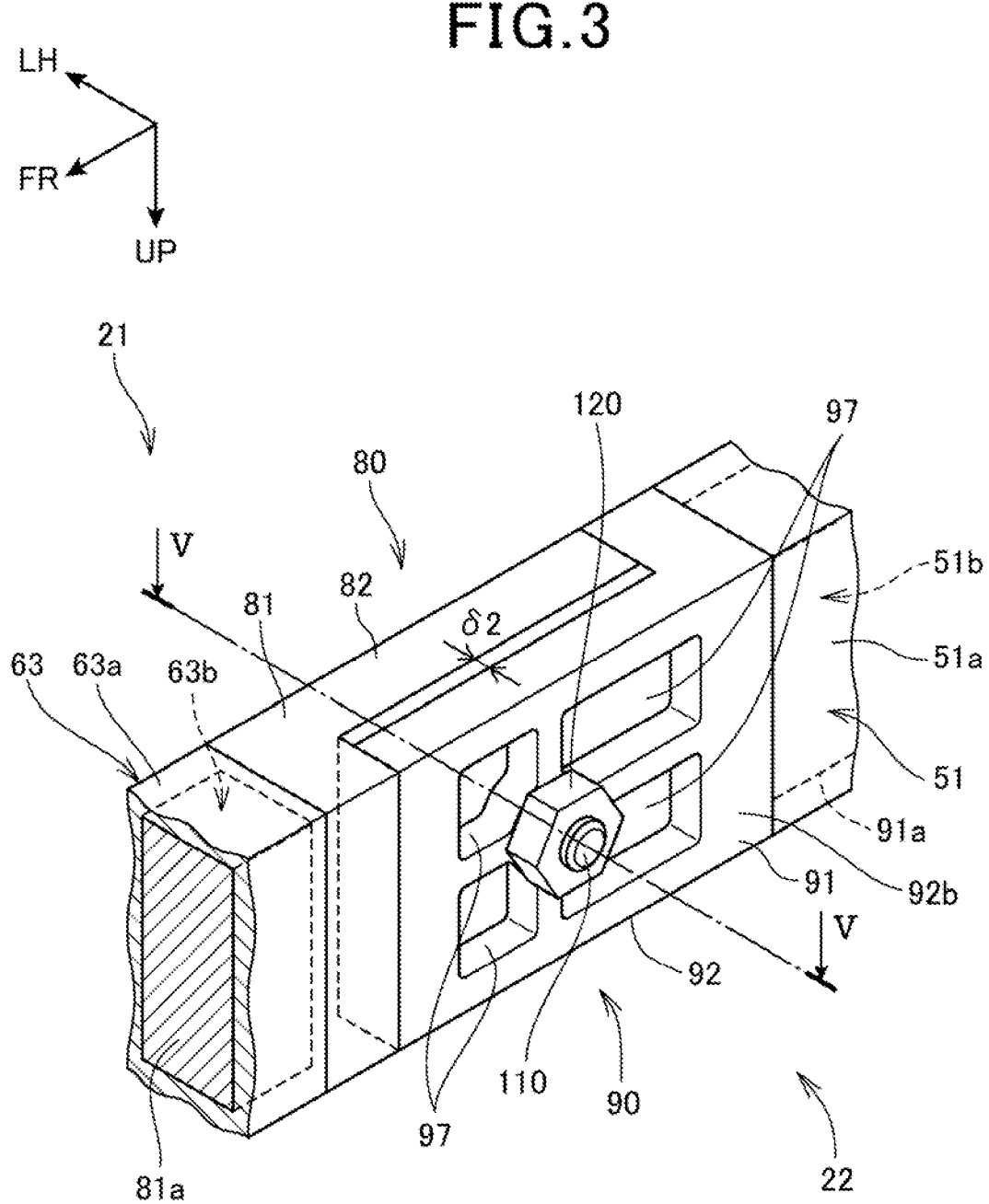
FIG. 3 is a perspective view of a joint portion of a front frame and a center frame.

FIG. 3 is an enlarged view of the joint portion of the front frame 21 and the center frame 22. Also, in FIG. 3, because of the view from below, the shape of the joint portion of the front frame 21 and the center frame 22 looks opposite to that of FIG. 2.

The connection lower frame (frame member) 63 of the front frame 21 and the center lower frame (frame member) 51 of the center frame 22 are formed into a similar angular tube shape. To the rear end portions of the connection lower frames 63, connection portions 80 are fixed. Also, to the front end portions of the center lower frames 51, connection portions 90 are fixed.

The connection portions 80, 90 are made of steel. The connection portions 80, 90 can be made by casting or forging. The connection portions 80, 90 have an L-shaped notch shape in a bottom surface view. The connection portions 80, 90 include base portions 81, 91 and opposition portions 82, 92, the base portions 81, 91 extending from the frames 63, 51, the opposition portions 82, 92 having a narrower width compared to the base portions 81, 91.

One opposition portion 82 and the other opposition portion 92 are disposed so as to be layered facing each other. The layered portion of the opposition portions 82, 92 forms such integrated shape that the step of one base portion 81 and the other base portion 91 becomes small. The pair of connection portions 80, 90 are formed into a so-called half-lap joint shape.

The base portions 81, 91 include leg portions 81*a*, 91*a*. The leg portions 81*a*, 91*a* are formed to have a size of being inserted to and fitted into hollow spaces 63*b*, 51*b* of end portions 63*a*, 51*a* of the frame 63, 51. To the hollow spaces 63*b*, 51*b* of the respective frames 63, 51, the leg portions 81*a*, 91*a* are inserted. In this state, the connection portions 80, 90 are welded and are fixed to the frames 63, 51.

Figure 4:
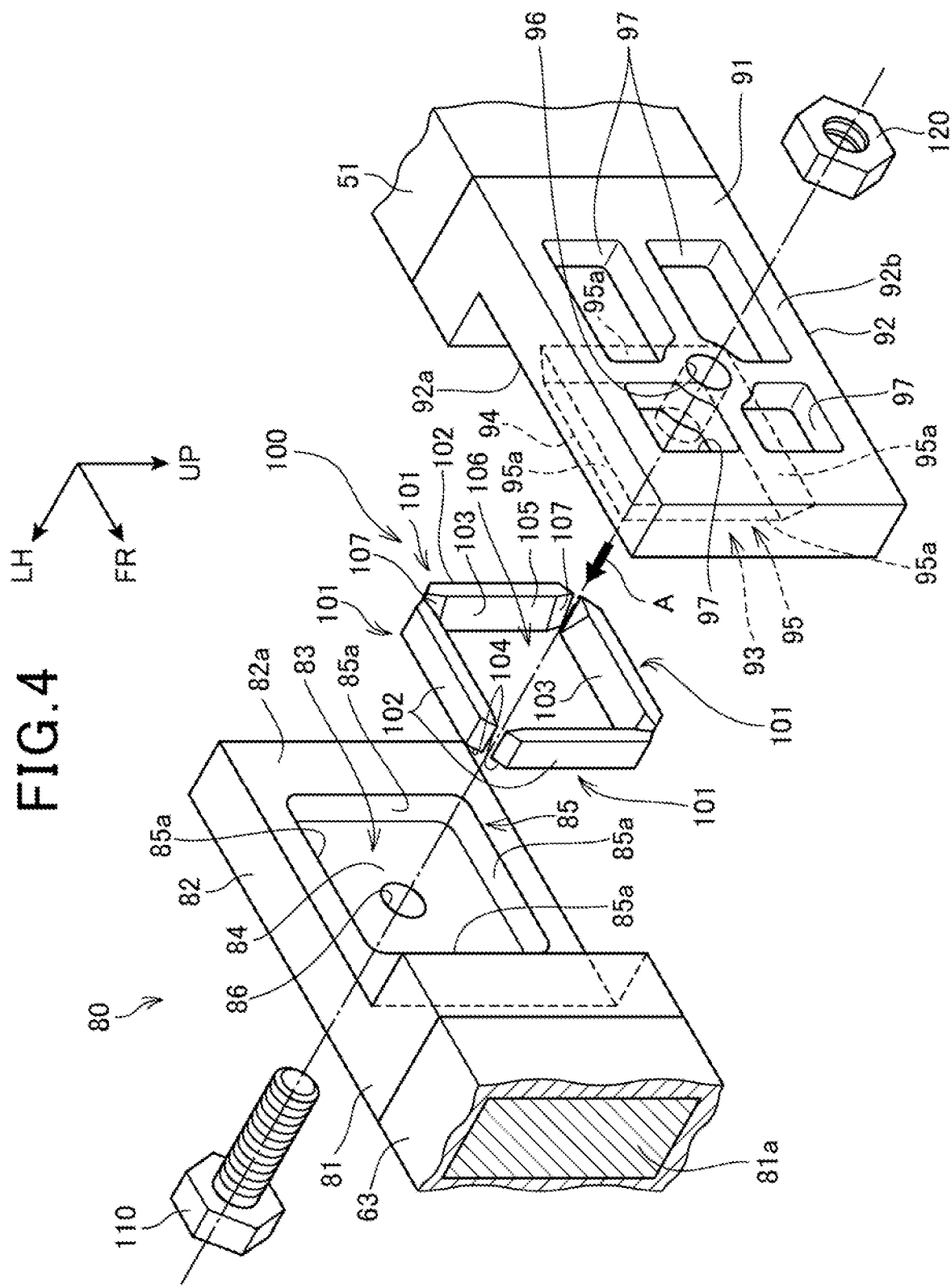
FIG. 4 is an exploded perspective view of the joint portion.

FIG. 4 is an exploded perspective view of the joint portion. The opposition portion 82 of one connection portion 80 includes an opposition surface 82*a* facing the other connection portion 90. In the opposition portion 82, a recessed portion 83 is formed, the recessed portion 83 being recessed in the thickness direction with respect to the opposition surface 82*a*. The recessed portion 83 has a recessed shape formed by a bottom portion 84 and an inner peripheral wall 85, the bottom portion 84 having a rectangular shape, the inner peripheral wall 85 standing in a wall shape with respect to the bottom portion 84. In the inner peripheral wall 85, four abutment surfaces (wall surfaces) 85*a* are formed correspondingly to the rectangular shape.

The abutment surface 85*a* has a flat surface. At the center portion of the bottom portion 84, a fastening hole 86 is formed, the fastening hole 86 penetrating in the vehicle width direction. The abutment surfaces 85*a* are disposed so as to cross the radial direction of the fastening hole 86. In the opposition portion 82, the pair of abutment surfaces 85*a* of the inner peripheral wall 85 located above and below the fastening hole 86 and the pair of abutment surfaces 85*a* of the inner peripheral wall 85 located in front of and behind the fastening hole 86 are formed.

The connection portion 80 including the recessed portion 83 will be hereinafter explained as the recessed side connection portion 80.

Also, in the connection portions 80, 90, the axial direction means the direction of a shaft orthogonal to the bottom portion 84 at the center portion of the bottom portion 84 of the recessed portion 83, and the radial direction is used with respect to the diameter of the orthogonal shaft. In the present embodiment, the shaft and diameter of a bolt 110 inserted to the fastening hole 86 correspond.

The opposition portion 92 of the other connection portion 90 includes an opposition surface 92*a* facing the recessed side connection portion 80. In the opposition portion 92, a projected portion 93 is formed, the projected portion 93 projecting to the recessed side connection portion 80 side. The projected portion 93 is formed correspondingly to the position of the recessed portion 83 of the recessed side connection portion 80. The projected portion 93 is formed into a pedestal shape that narrows as it departs from the opposition surface 92*a*, and includes a crest portion 94 having a rectangular shape and a tapered wall portion 95. In the tapered wall portion 95, tapered surfaces 95*a* are formed, the tapered surfaces 95*a* facing the respective abutment surfaces 85*a* of the inner peripheral wall 85 of the recessed portion 83. In the projected portion 93, at the center portion of the crest portion 94, a fastening hole 96 is formed, the fastening hole 96 penetrating in the vehicle width direction. The tapered surfaces 95*a* cross the fastening hole 96 in the radial direction. In the opposition portion 92, the pair of tapered surfaces 95*a* of the tapered wall portion 95 located above and below the fastening hole 96 and the pair of tapered surfaces 95*a* of the tapered wall portion 95 located in front of and behind the fastening hole 96 are formed.

The connection portion 90 including the projected portion 93 will be hereinafter explained as the projected side connection portion 90.

On an outer surface 92*b* side of the opposition portion 92 of the projected side connection portion 90, relief recesses 97 are formed around the fastening hole 96. The opposition portion 82 of the recessed side connection portion 80 is formed with the recessed portion 83 to reduce the thickness, whereas the opposition portion 92 formed with the projected portion 93 increases the thickness. Therefore, the relief recesses 97 are formed with respect to the opposition portion 92 of the projected side connection portion 90 to achieve weight reduction.

Between the recessed side connection portion 80 and the projected side connection portion 90, an expansion collar 100 is disposed. The expansion collar 100 is formed of a metal having lower hardness compared to the connection portions 80, 90. The expansion collar 100 of the present embodiment is made of aluminum. The expansion collar 100 is formed into a generally rectangular annular shape sandwiched by the inner peripheral wall 85 of the recessed portion 83 and the tapered wall portion 95 of the projected portion 93. Since the hardness of the expansion collar 100 is lower than that of the connection portions 80, 90, deformation of the connection portions 80, 90 can be suppressed. Also, at the time of the maintenance, it is common that only the expansion collar 100 has to be replaced, the expansion collar 100 being easily deformable.

The expansion collar 100 includes plural number of split bodies 101. Each of the split bodies 101 is formed into the same shape. The expansion collar 100 includes four split bodies 101 according to the rectangular shape of the recessed portion 83 and the projected portion 93.

Each of the split bodies 101 is respectively formed into an angular column shape abutting on a set of the abutment surface 85a and the tapered surface 95a facing each other out of four sets of the abutment surface 85a and the tapered surface 95a. The split body 101 includes an abutment surface 102 having a flat shape abutting on the abutment surface 85a of the inner periphery of the recessed portion 83. Also, the split body 101 includes a tapered surface 103 abutting on the tapered surface 95a of the projected portion 93. Further, the split body 101 includes a large end surface 104 on the recessed side connection portion 80 side and a small end surface 105 on the projected side connection portion 90 side.

At both ends in the axial direction of the angular column shape of the split body 101, inclined surfaces 107 are formed, the inclined surface 107 inclining so that the tapered surface 103 becomes shorter than the abutment surface 102. By bringing the inclined surfaces 107 of the respective split bodies 101 adjacently to each other, a generally rectangular annular shape is formed by the respective split bodies 101. A hole-shape portion 106 having a generally rectangular shape is formed by a space surrounded by the tapered surfaces 103 of the respective split bodies 101.

Here, the expansion collar 100 is arranged in the recessed portion 83, and the projected portion 93 is moved toward the recessed portion 83 as shown by the arrow A and is made to enter the hole-shape portion 106 of the expansion collar 100. Since the projected portion 93 moves in the axial direction so as to approach the bottom portion 84 of the recessed portion 83, the expansion collar 100 receives a force of moving in the radial direction from the projected portion 93 through the tapered surfaces 103. Also, the respective split bodies 101 of the expansion collar 100 move while changing the attitude so as to be brought into surface-contact with the abutment surfaces 85a of the recessed portion 83. Thus, alignment is executed, and it is configured to easily absorb the manufacturing error of the split body 101 and the like. Also, the bolt 110 is inserted to the fastening holes 86, 96, and the bolt 110 is fastened by a nut 120. Thus, the connection portions 80, 90 are connected to each other in a state where a fastening force is applied to the connection portions 80, 90 from the bolt 110 in the axial direction.

Figure 5:
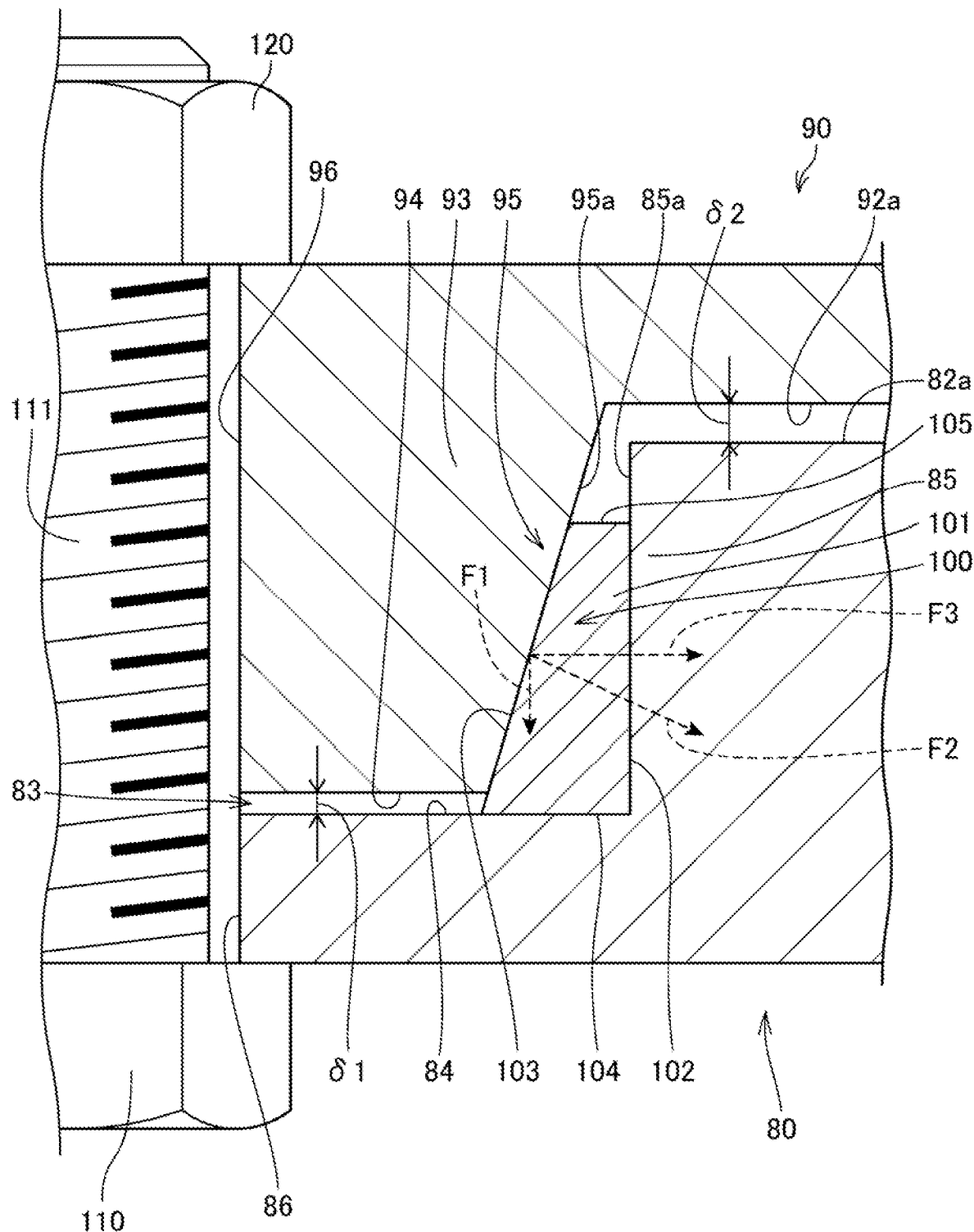
FIG. 5 is a cross-sectional view taken along the line V-V of FIG. 3.

FIG. 5 is a cross-sectional view taken along the line V-V of FIG. 3.

It is set so that, when the connection portions 80, 90 are connected to each other, a gap 51 is generated between the bottom portion 84 of the recessed portion 83 and the crest portion 94 of the projected portion 93 and a gap 52 is generated between the opposition surface 82a and the opposition surface 92a. Also, it is set so that the large end surface 104 of the expansion collar 100 is brought into a state of contacting the bottom portion 84. Since there exist the gaps δ1, δ2, fitting is effected in a state where the expansion collar 100 has moved in the radial direction by a fastening force of the bolt 110 and the nut 120 and press contact has finished. In this case, a relation of δ1<δ2 is allowed between the gap δ1 and the gap δ2.

At this time, since the fastening force in the axial direction of the bolt 110 is applied, a force of the direction of approaching the bottom portion 84 of the recessed portion 83 is applied to the projected portion 93. A force F1 of the axial direction is applied to the tapered surface 95a of the projected portion 93, and the tapered surface 103 of the expansion collar 100 contacting the tapered surface 95a receives a normal force F2 and receives a force F3 of outward in the radial direction. Each of the split bodies 101 of the expansion collar 100 receives a force of being directed to the inner peripheral wall 85 of the recessed portion 83, and the abutment surface 102 of the split body 101 surface-contacts the abutment surface 85a of the inner peripheral wall 85. Therefore, by the fastening force of the bolt 110 and the nut 120, the surface-contact state of the split bodies 101 and the inner peripheral wall 85 of the recessed portion 83 is kept.

To the contrary, a force received by the expansion collar 100 inward in the radial direction from the inner peripheral wall 85 can be offset by the fastening force of the axial direction of the bolt 110 and the nut 120 by the tapered surfaces 103 of the expansion collar 100. With respect to the split bodies 101 of the expansion collar 100, a state where the projected portion 93 is fit into the recessed portion 83 is firmly kept in a state of abutting on the respective abutment surfaces 85a of the top, bottom, left, and right.

Also, to a shaft 111 of the bolt 110, a shear force namely a force crossing the shaft is hardly applied. Therefore, it is hard to reduce the number of pieces of the bolt 110 and the nut 120.

As described above, the expansion collar 100 abuts on the abutment surfaces 85a with the abutment surfaces 102 in the vertical direction and the vehicle longitudinal direction which are the radial direction, abuts on the tapered surfaces 95a with the tapered surfaces 103 in the left-right direction which is the axial direction, and is fit in the three dimensional directions. With respect to the connection portions 80, 90, not only the bending moment but also the stiffness with respect to the torsion around the axial direction improves.

As explained above, according to the first embodiment to which the present invention is applied, the frame joint connecting the connection portions 80, 90 to each other, the connection portions 80, 90 being arranged in the body frame 11, includes the inner peripheral wall 85 including the abutment surfaces 85a, the abutment surfaces 85a being arranged in the recessed side connection portion 80 and crossing with each other in the radial direction, the tapered surfaces 95a arranged in the projected side connection portion 90 and facing the inner peripheral wall 85, the expansion collar 100 movable in the radial direction so as to abut on the inner peripheral wall 85, and the bolt 110 and the nut 120 keeping fitting of the expansion collar 100 in a state where the expansion collar 100 abuts on the inner peripheral wall 85. Therefore, fitting of the expansion collar 100 can be kept in a state where the expansion collar 100 is moved in the radial direction and is made to abut on the inner peripheral wall 85, the rigidity of the fitting portion can be improved, it is not required to increase the number of pieces of the bolt 110 and the nut 120, and assembling can be simplified.

According to the first embodiment, the inner peripheral walls 85 are arranged by a pair for the top and bottom and the left and right respectively, and the expansion collar 100 is disposed so as to face the respective pairs of the inner peripheral walls 85 and has a shape of abutting on the inner abutment surfaces 85a in a surface-contact state. Therefore, since abutting is effected in a surface-contact state by the pair of inner peripheral walls 85 facing the expansion collars 100, bending rigidity around the axis of the fastener of the joint portion can be improved.

According to the first embodiment, the connection lower frames 63 of the front frame 21 and the center lower frames 51 of the center frame 22 are respective tubular bodies including the hollow spaces 51b, 63b in the inside, and the connection portions 80, 90 are formed separately from the frames 51, 63, and include the leg portions 81a, 91a inserted to the hollow spaces 51b, 63b of the frames 51, 63. Therefore, both of improvement of the rigidity of the frames 51, 63 having an angular tube shape and the degree of freedom of the shape of the connection portions 80, 90 can be achieved.

According to the first embodiment, the projected portion 93 and the recessed portion 83 are arranged in the connecting connection portions 80, 90 so as to face each other, the projected portion 93 including the tapered surfaces 95a, the recessed portion 83 receiving the projected portion 93, the inner peripheral walls 85 are formed in the recessed portion 83, and the fastening hole 96 is disposed at the center portion of the crest portion 94 of the projected portion 93, the bolt 110 being inserted to the fastening hole 96. Therefore, since the bolt 110 is inserted at the generally center portion of the recessed portion 83 including the inner peripheral wall 85 fitting into the projected portion 93 through the expansion collar 100, the projected portion 93 including the tapered surfaces 95a, a fastening force of the bolt 110 and the nut 120 can be transmitted evenly to the respective split bodies 101 of the expansion collar 100, and assembling workability improves.

Second Embodiment

Figure 6:
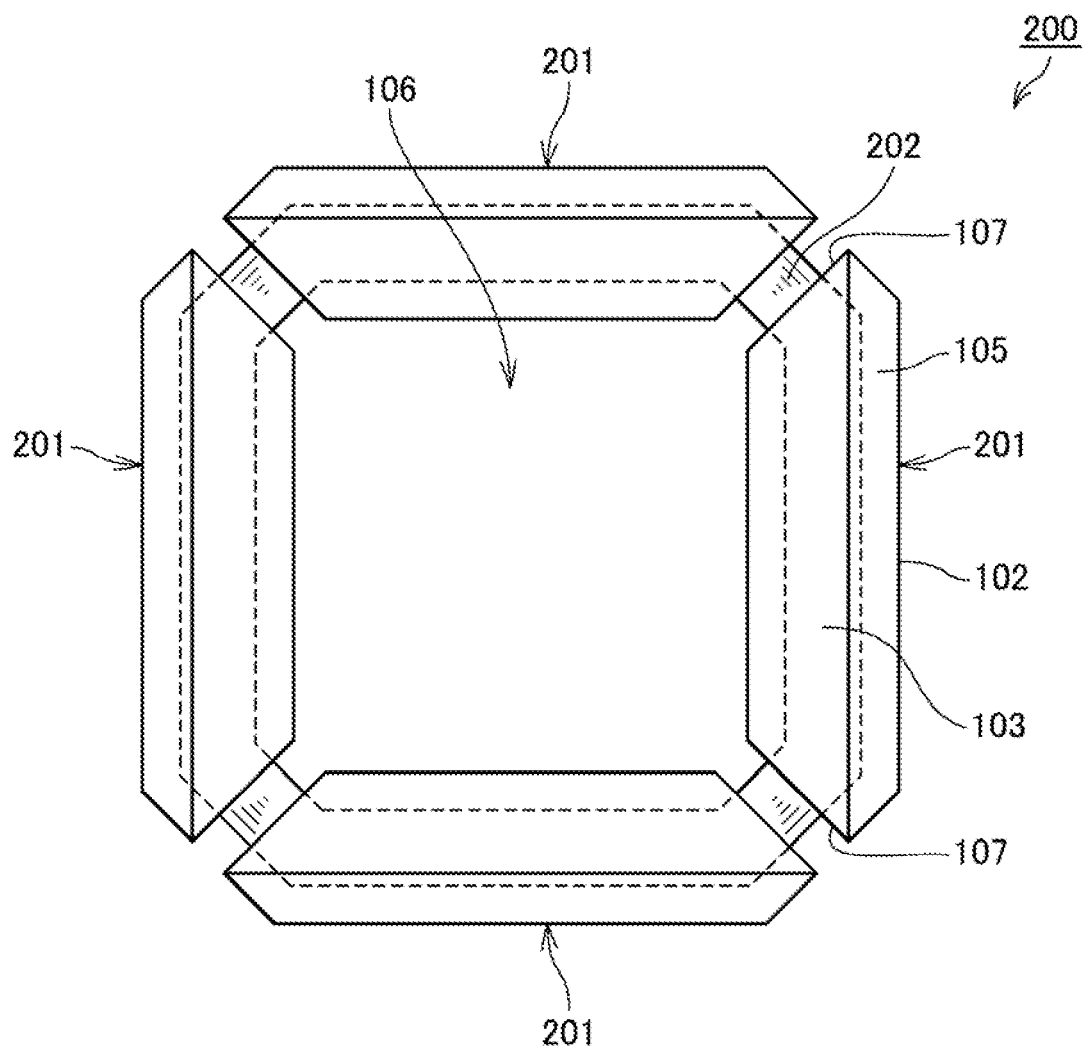
FIG. 6 is a left side view of an expansion collar of the second embodiment.

FIG. 6 is a left side view of an expansion collar 200 of the second embodiment.

In explanation of the second embodiment, a configuration similar to that of the first embodiment will be marked with the same reference sign, and explanation thereof will be omitted.

The expansion collar 200 of the second embodiment includes plural number of split bodies 201 and a rubber (elastic body) 202 connecting the respective split bodies 201 in an annular shape. The outer shape of the split body 201 is formed into the same as that of the split body 101 of the first embodiment. The respective split bodies 201 are connected to each other by the annular rubber 202. With respect to the expansion collar 200, the rubber 202 can be incorporated to the inside of the split bodies 201 by a mold for example.

Since plural number of the split bodies 201 can be handled collectively, it is easy to attach the split bodies 201 to the recessed portion 83 at the time of assembling. Also, when the projected portion 93 is made to enter the hole-shape portion 106 of the expansion collar 200 disposed in the recessed portion 83, the rubber 202 extends, and the respective split bodies 201 can move in the radial direction.

As explained above, according to the second embodiment, the expansion collar 200 is configured with plural number of the split bodies 201 and can be attached to the recessed portion 83 with the split bodies 201 being connected to each other by the rubber. Therefore, since plural number of the split bodies 201 of the expansion collar 200 can be assembled collectively, assembly workability improves.

Third Embodiment

Figure 7:
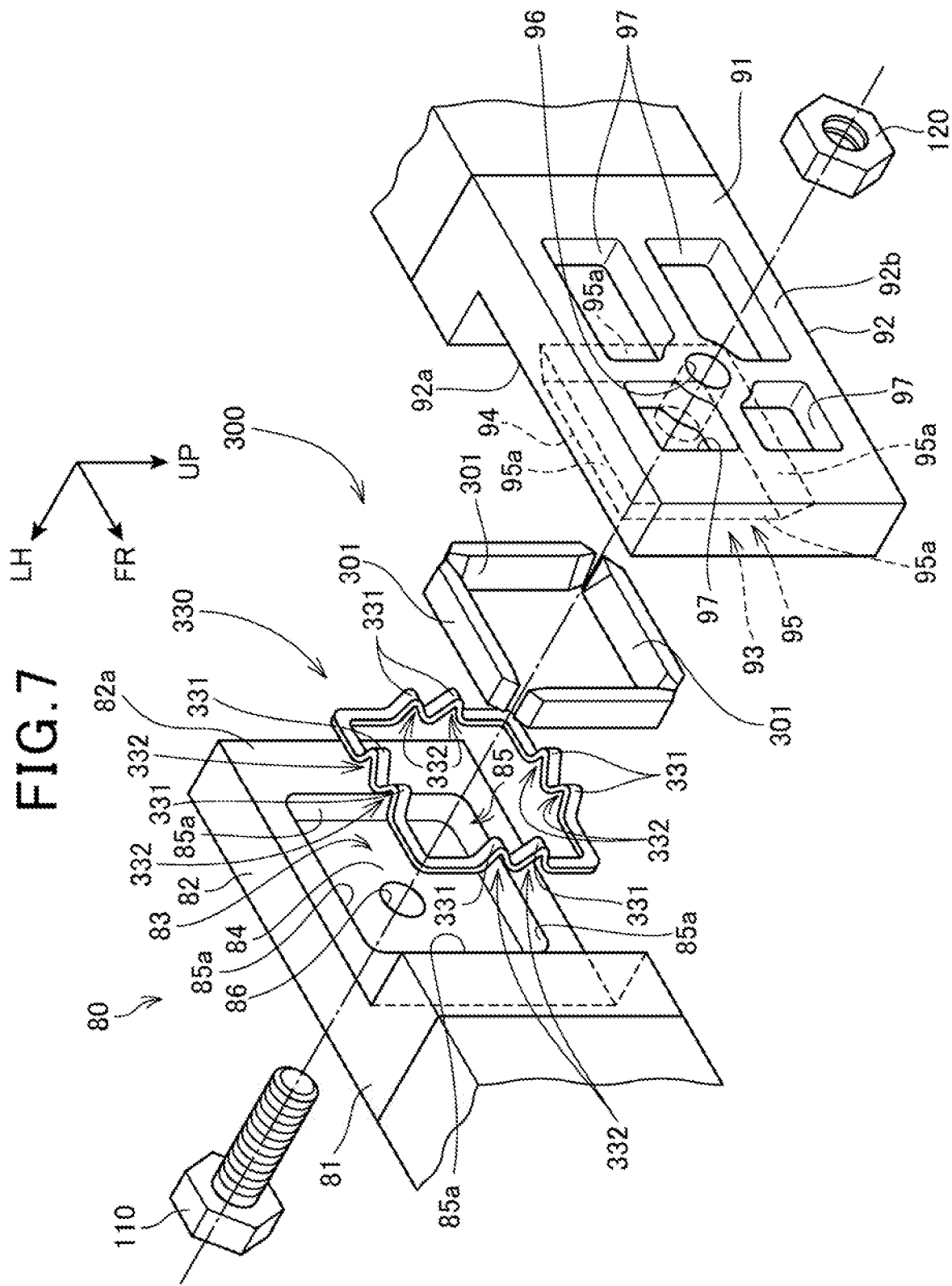
FIG. 7 is an exploded perspective view of a joint portion of the third embodiment.

FIG. 7 is an exploded perspective view of a joint portion of the third embodiment.

In explanation of the third embodiment, a configuration similar to that of the first embodiment will be marked with the same reference sign, and explanation thereof will be omitted.

According to the third embodiment, between the recessed side connection portion 80 and an expansion collar 300, a disk spring (a wave-type resilient section) 330 is disposed. The disk spring 330 has a shape corresponding to the expansion collar 300, and is formed into a rectangular annular shape. In the disk spring 330, plural number of plate spring portions (arc-shape plate spring portions) 331 are formed, the plate spring portions 331 curving in an arc shape so as to wave. Open spaces 332 are formed by a curved surrounding shape of the respective plate spring portions 331. The plate spring portion 331 is formed so as to correspond to the position of each split body 301 of the expansion collar 300. In concrete terms, the plate spring portions 331 are formed by a pair for each of the abutment surfaces 85a of the recessed portion 83. Also, the respective split bodies 301 of the expansion collar 300 of the third embodiment become shorter than the split bodies 101 of the expansion collar 100 in the axial direction since the disk spring 330 is disposed.

Further, between the gap 51 and the gap 52, the gap 51 being between the crest portion 94 of the projected portion 93 and the bottom portion 84 of the recessed portion 83, the gap 52 being between the opposition surface 82a and the opposition surface 92a, a relation of $\delta 1 < \delta 2$ is allowed, and it is configured that the fastening force of the bolt 110 is transmitted to the expansion collar 300 and the disk spring 330 to the end.

Figure 8:
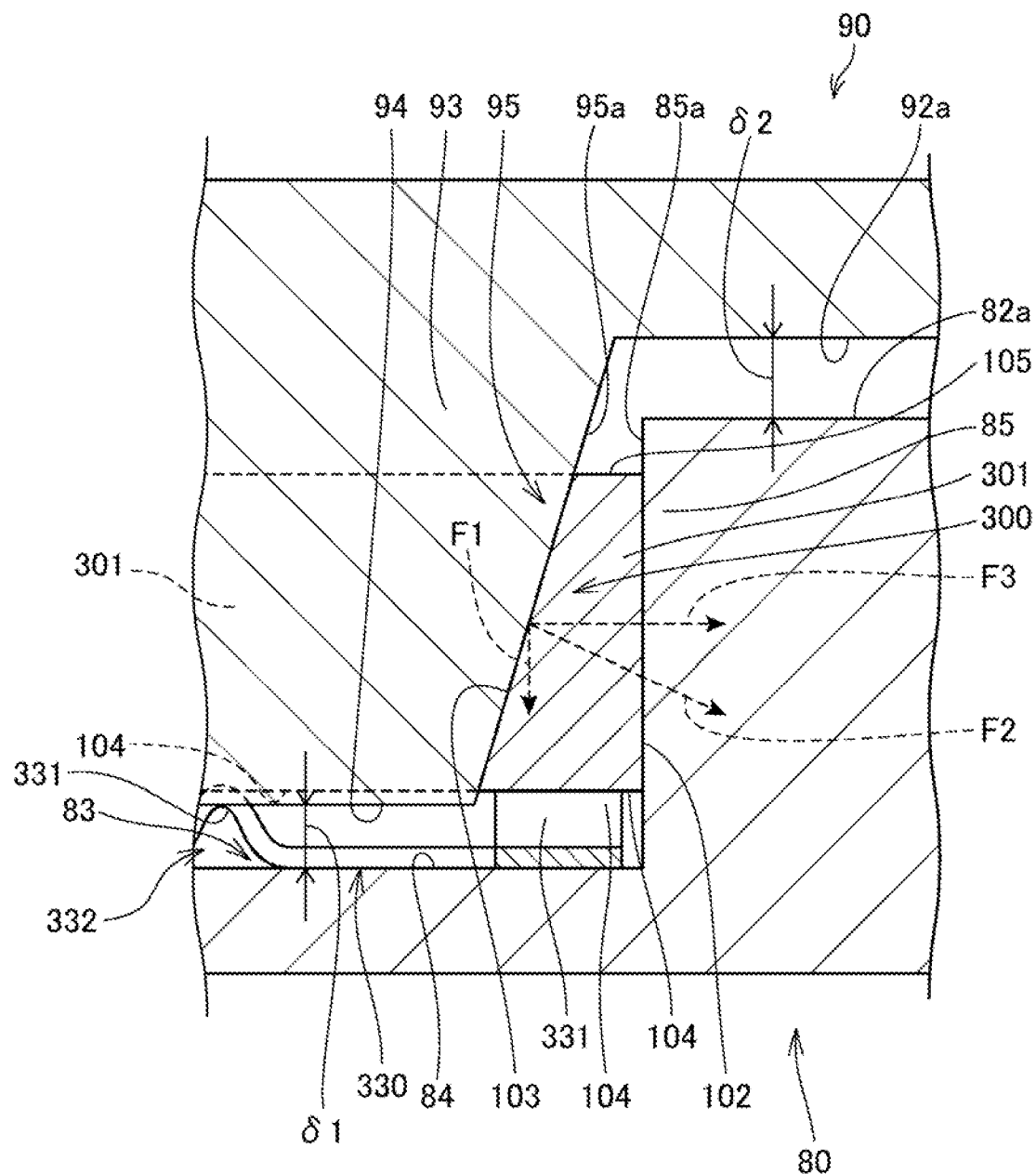
FIG. 8 is a cross-sectional view of the joint portion of the third embodiment.

FIG. 8 is a cross-sectional view of the joint portion of the third embodiment.

According to the third embodiment, when the recessed side connection portion 80 and the projected side connection portion 90 are to be connected to each other, the disk spring 330 is disposed in the recessed portion 83, and the expansion collar 300 is disposed so as to be overlaid on the disk spring 330. Also, the recessed side connection portion 80 and the projected side connection portion 90 are fastened and connected to each other by the bolt 110 and the nut 120. At this time, the plate spring portions 331 of the disk spring 330 contact the large end surfaces 104 of the respective split bodies 301 of the expansion collar 300, and exert pressure to the respective split bodies 301. Generally, the expansion collar 300 and the like have a manufacturing error and the like, and the respective split bodies 301 move at different timing. Therefore, there was a possibility that either pair of split bodies out of a top and bottom pair and a front and rear pair were fit to each other and fitting of the other pair of split bodies was not completed to cause chattering. Meanwhile, according to the third embodiment, since the disk spring 330 is disposed, when the surrounded shape changes by a force applied to the plate spring portions 331 and the open spaces 332 deform, a resilient force is transmitted to the adjacent plate spring portion 331. It is configured that a shift of the fitting timing of the respective split bodies 301 can be absorbed.

As explained above, according to the third embodiment, the expansion collar 300 is configured with plural number of the split bodies 301, the disk spring 330 is arranged on the large end surfaces (the surfaces in the fastening direction) 104 of the expansion collar 300, the disk spring 330 being capable of transmitting an overall energizing force to the respective split bodies 301, and the expansion collar 300 is energized to the insertion side of the tapered surfaces 95a of the projected portion 93. Therefore, since the fitting timing of plural number of the split bodies 301 of the expansion collar 300 can be synchronized between the adjacent split bodies 301 of the expansion collar 300, fitting quality improves.

According to the third embodiment, the disk spring 330 is arranged so that plural number of the arc-shape plate spring portions 331 continue in the peripheral direction, the arc-shape plate spring portion 331 including the open space 332, and the open space 332 deforms by a force applied to the arc-shape plate spring portion 331, and a resilient force can transmit to the adjacent plate spring portion 331. Therefore, since the resilient force is propagated to the adjacent arc-shape plate spring portion 331 by deformation of the open space 332 of the time when the arc-shape plate spring portion 331 including the open space 332 is compressed, dispersion of the fitting timing of the expansion collar 300 can be reduced.

Fourth Embodiment

Figure 9:
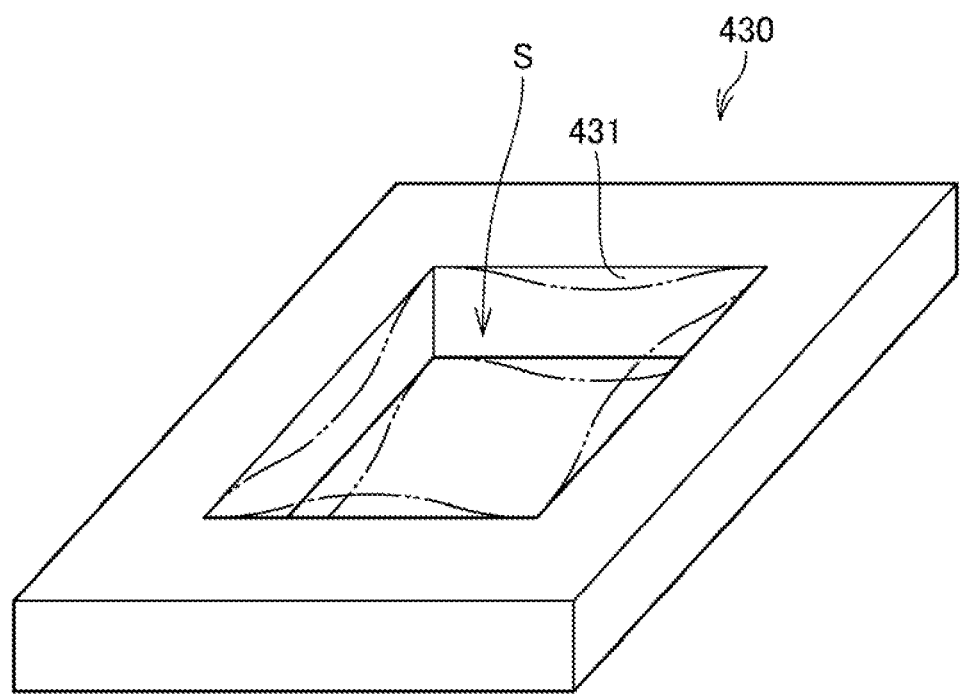
FIG. 9 is a perspective view of a hard sponge of the fourth embodiment.

FIG. 9 is a perspective view of a hard sponge 430 of the fourth embodiment.

In explanation of the fourth embodiment, a configuration similar to that of the third embodiment will be marked with the same reference sign, and explanation thereof will be omitted.

According to the fourth embodiment, a hard sponge (a resilient section made of a resin) 430 is disposed instead of the disk spring 330 of the third embodiment. The hard sponge 430 has a shape corresponding to the expansion collar 300, and is formed into a rectangular annular shape. The hard sponge 430 includes a hole portion 431 at the center portion, the hole portion 431 having a rectangular annular shape. The hard sponge 430 is formed to have a thickness allowing to exert pressure in the axial direction to the expansion collar 300 at the time of completion of fitting of the recessed portion 83 and the projected portion 93.

Figure 10:
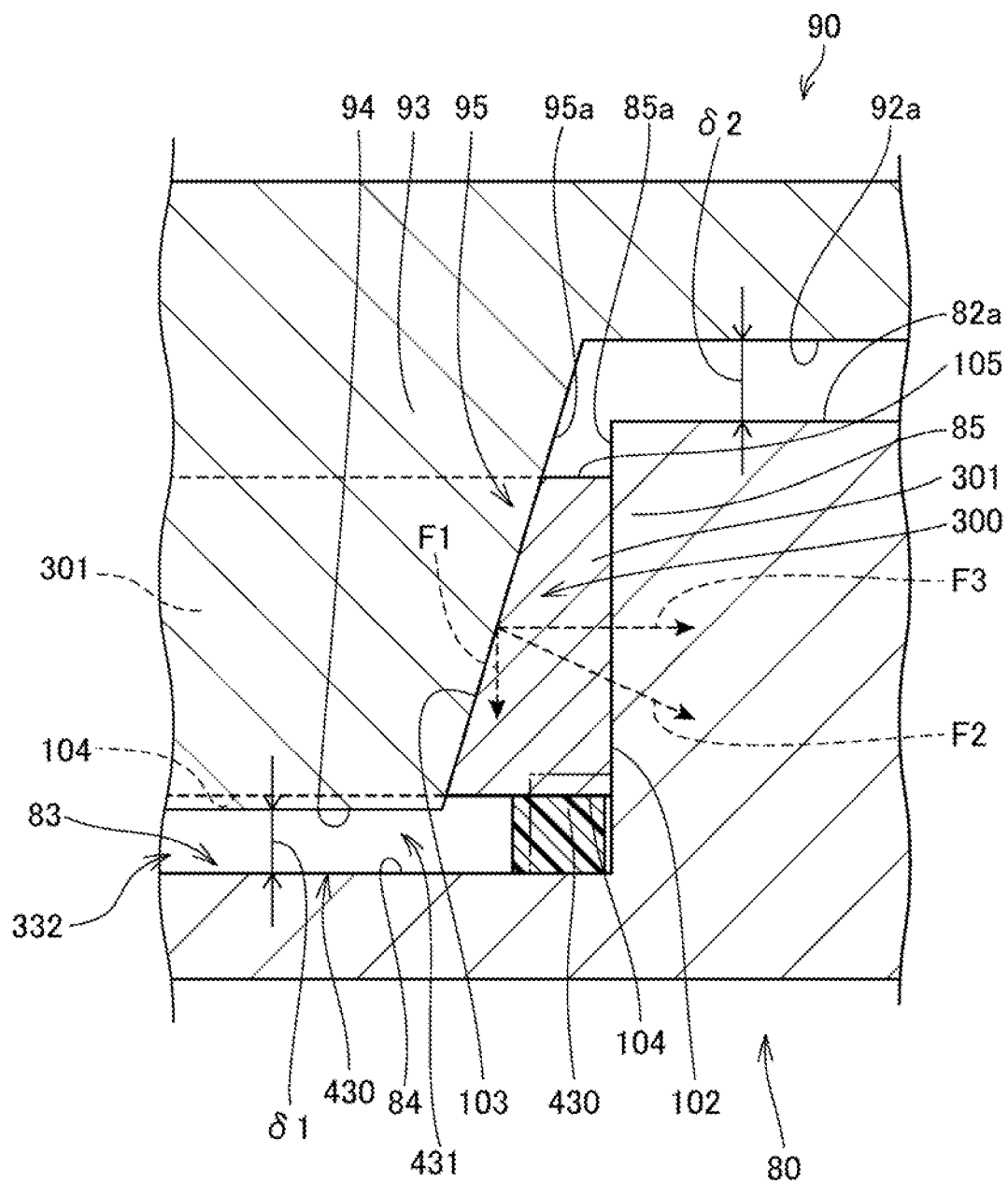
FIG. 10 is a cross-sectional view of a joint portion of the fourth embodiment.

FIG. 10 is a cross-sectional view of the joint portion of the fourth embodiment.

The hard sponge 430 is disposed in the recessed portion 83. Since the hard sponge 430 has a rectangular annular shape lining the shape of the bottom portion 84 of the recessed portion 83, a space S is arranged, the space S being compressed and deformed as shown by the two dots chain line on the inner side of the annular shape in elastically deforming as shown in FIG. 9. Also, when the recessed side connection portion 80 and the projected side connection portion 90 are to be connected to each other, the hard sponge 430 contacts the large end surfaces 104 of the respective split bodies 301 of the expansion collar 300, can exert pressure to the respective split bodies 301 while elastically deforming from a state shown by the two dots chain line of FIG. 10, and can absorb a shift of the fitting timing of the split bodies 301. At a portion of high pressure, the hard sponge 430 can elastically deform toward the space S of the hole portion 431. Since there exist the gaps δ1, δ2 (δ1<δ2), it is configured that the fastening force of the bolt 110 is transmitted to the expansion collar 300 and the hard sponge 430 to the end. A rubber sheet (a resilient section made of rubber) may be used instead of the hard sponge 430.

As explained above, in the fourth embodiment also, similarly to the third embodiment, since the fitting timing of plural number of the split bodies 301 of the expansion collar 300 can be synchronized between the adjacent split bodies 301 of the expansion collar 300, fitting quality improves.

Fifth Embodiment

Figure 11:
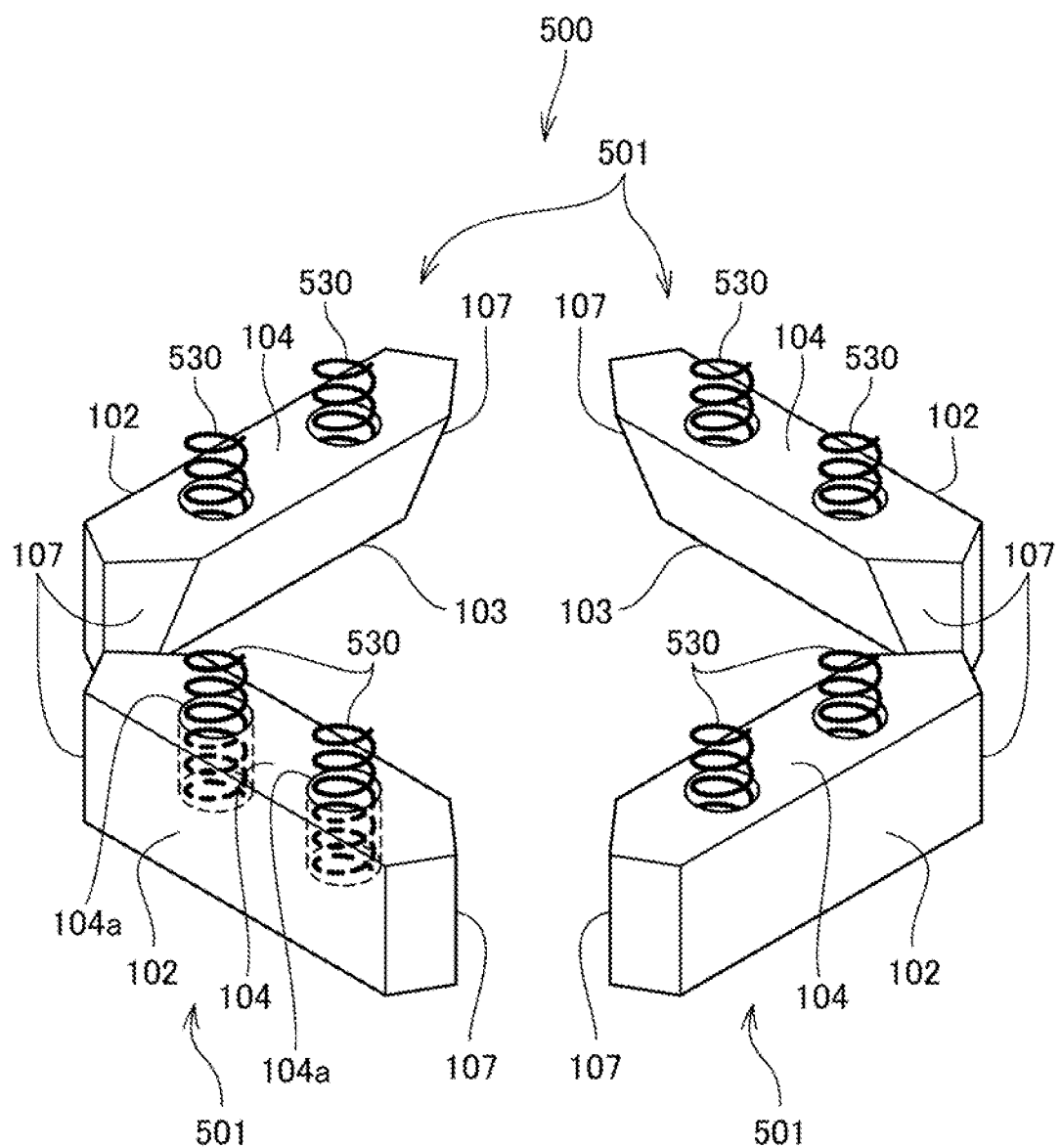
FIG. 11 is a perspective view of an expansion collar of the fifth embodiment.

FIG. 11 is a perspective view of an expansion collar 500 of the fifth embodiment.

In explanation of the fifth embodiment, a configuration similar to that of the first to third embodiments will be marked with the same reference sign, and explanation thereof will be omitted.

The expansion collar 500 of the fifth embodiment includes split bodies 501. The split bodies 501 are formed by four number of pieces. The split body 501 is formed into a generally same shape as that of the split body 301, and is different from the split body 301 in a point that attaching holes 505 are formed in the large end surface 104. In the large end surface 104 of the split body 501, a pair of attaching holes 104a are formed. The attaching hole 104a extends in the axial direction. A coil spring 530 is embedded in the attaching hole 104a.

Figure 12:
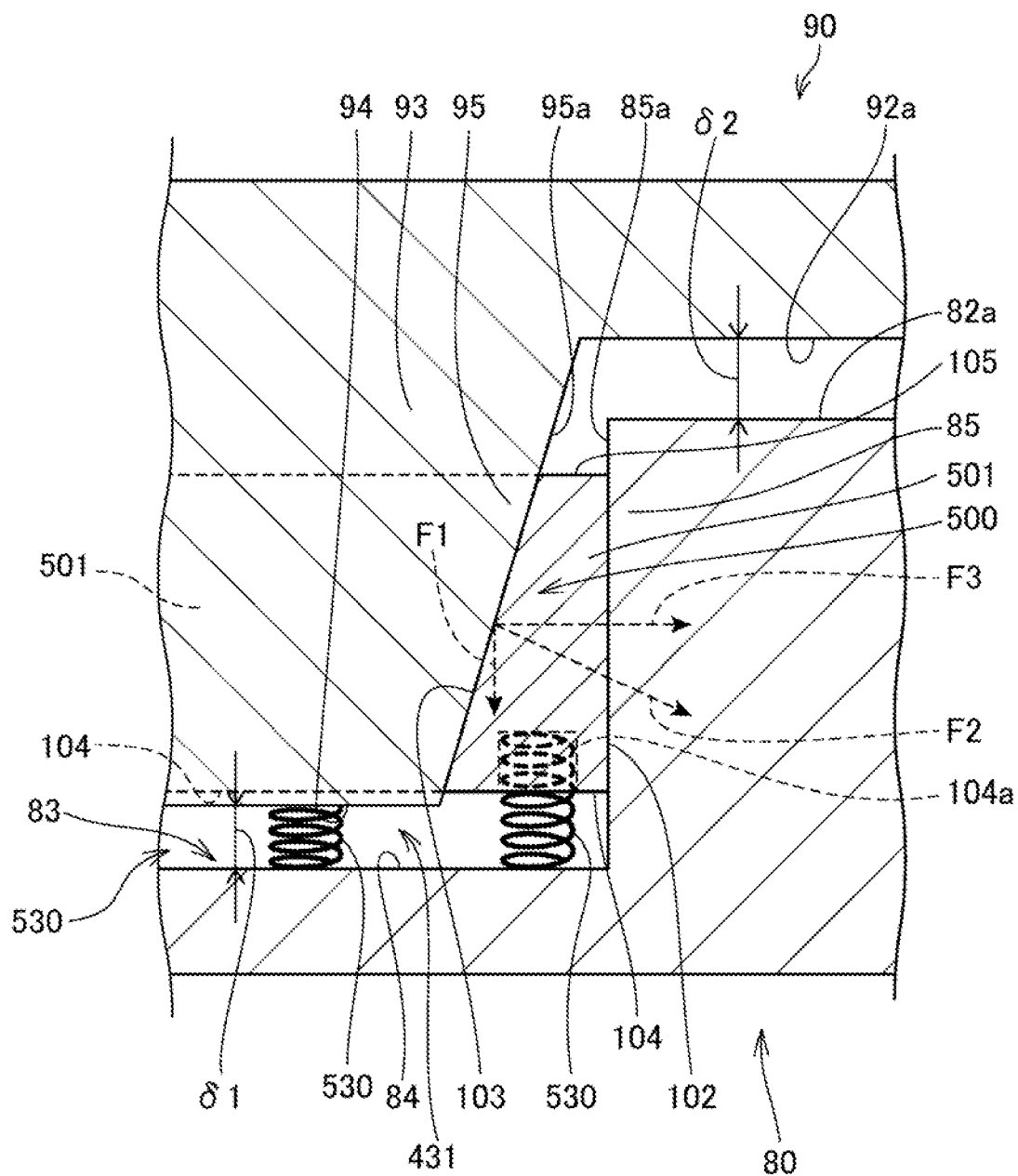
FIG. 12 is a cross-sectional view of a joint portion of the fifth embodiment.

FIG. 12 is a cross-sectional view of a joint portion of the fifth embodiment.

According to the expansion collar 500 of the fifth embodiment, the respective split bodies 501 can obtain pressure from the coil springs 530. Therefore, in the fifth embodiment also, similarly to the third embodiment, since the fitting timing of plural number of the split bodies 501 of the expansion collar 500 can be synchronized between the adjacent split bodies 501, fitting quality improves. Since there exist the gaps δ1, δ2 (δ1<δ2), the fastening force of the bolt 110 is transmitted to the expansion collar 500 to the end through the coil springs 530.

Sixth Embodiment

Figure 13:
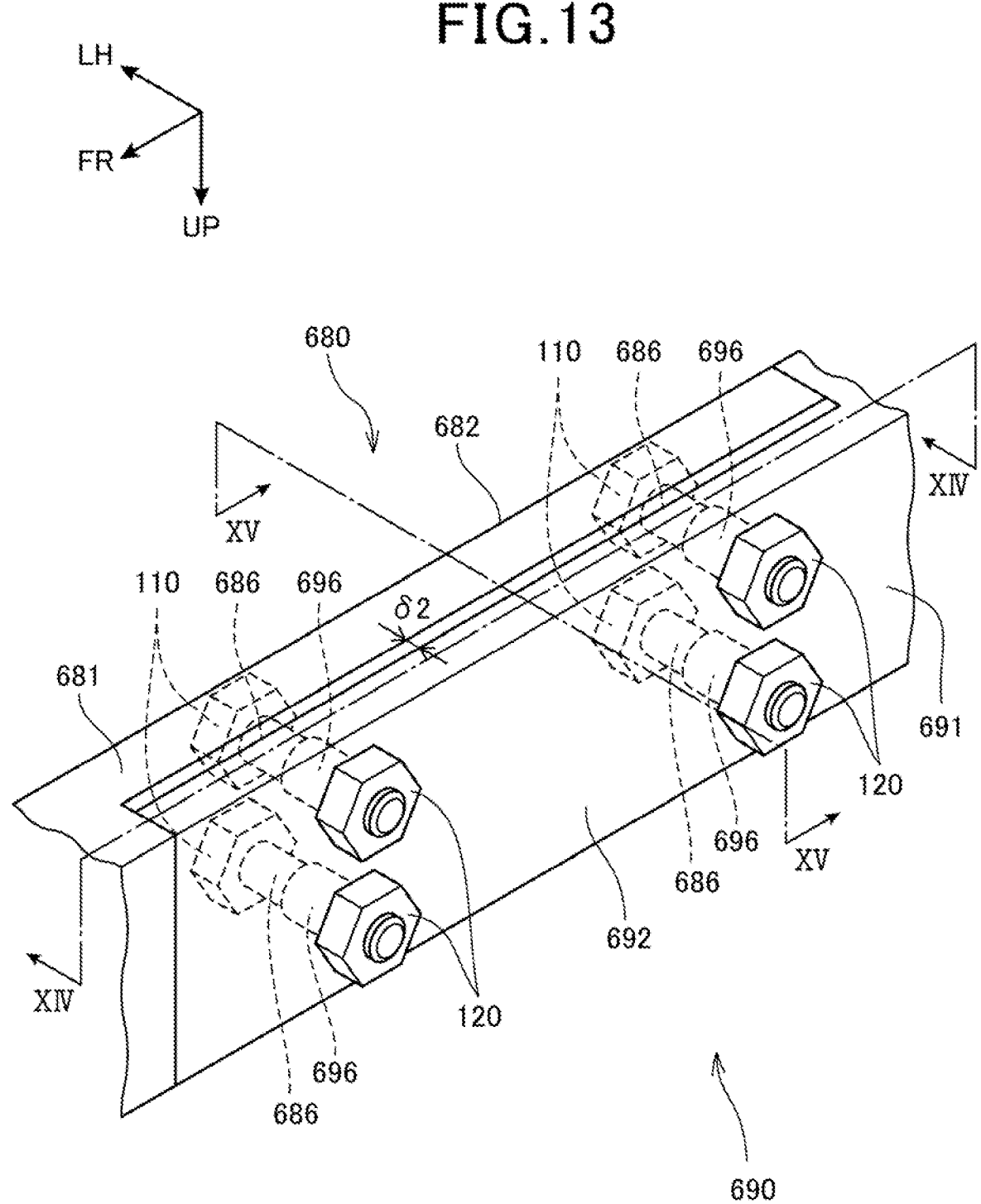
FIG. 13 is a perspective view of a joint portion of the sixth embodiment.
Figure 14:
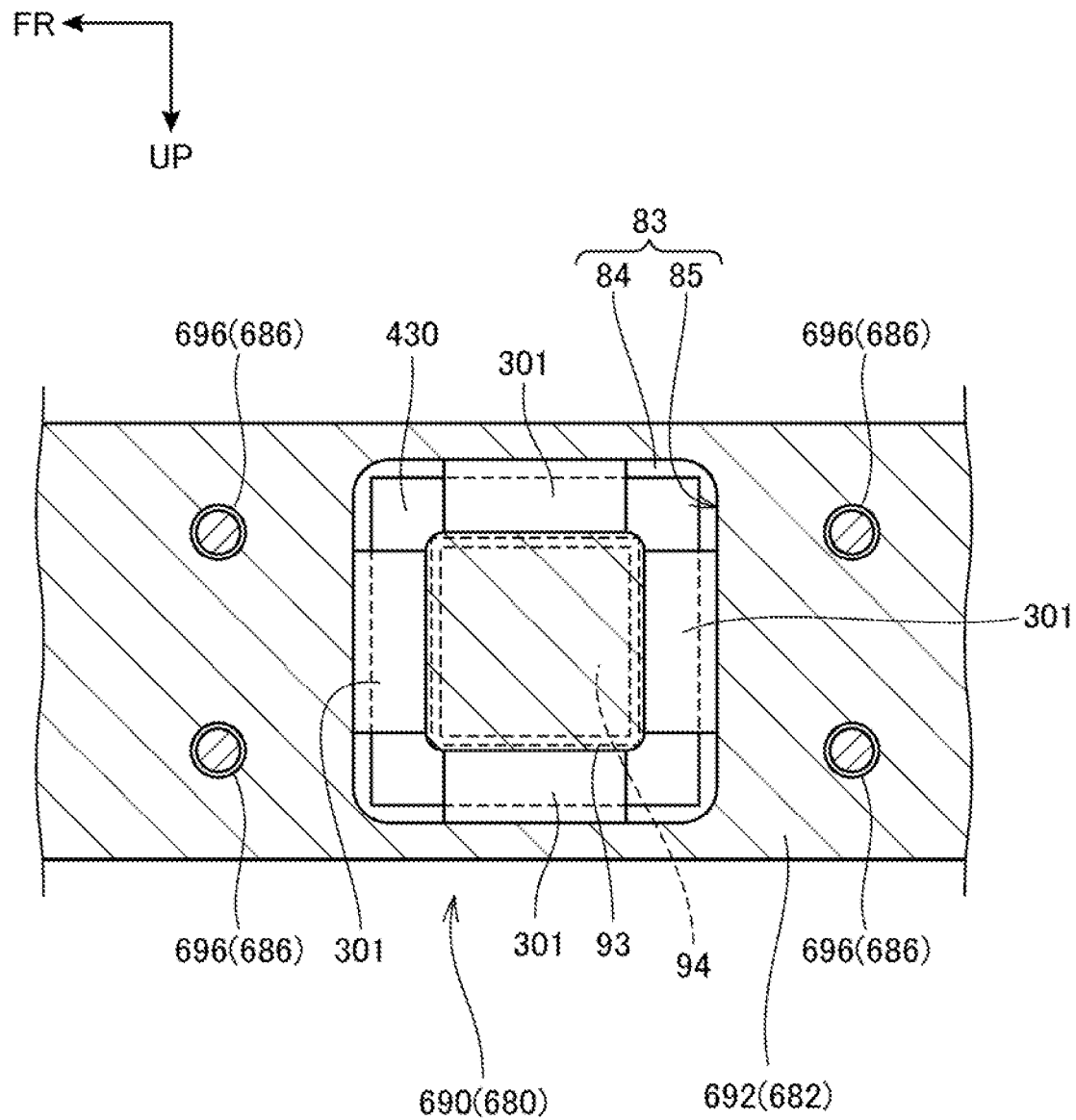
FIG. 14 is a cross-sectional view taken along the line XIV-XIV of FIG. 13.
Figure 15:
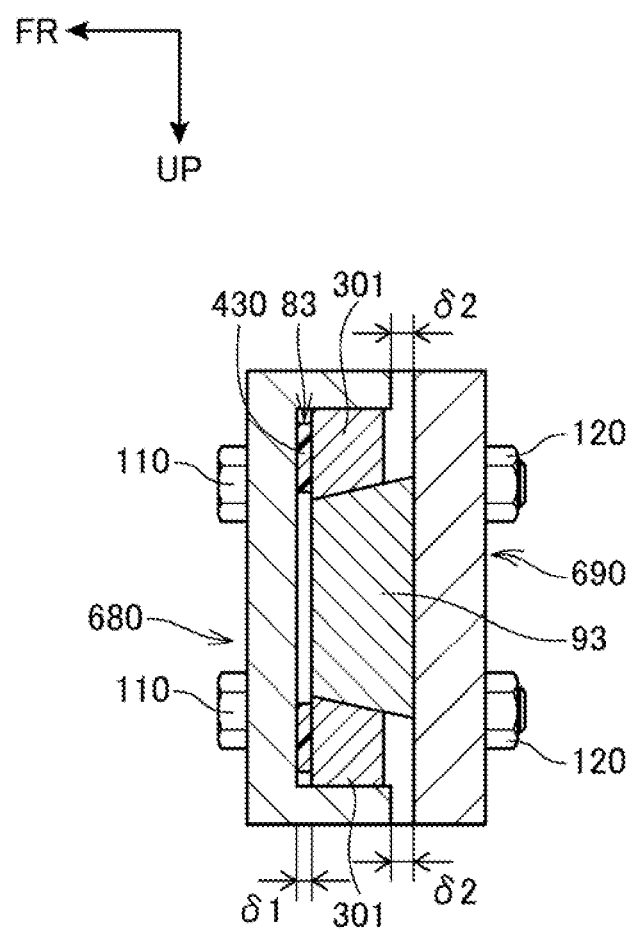
FIG. 15 is a cross-sectional view taken along the line XV-XV of FIG. 13.

FIG. 13 is a cross-sectional view of a joint portion of the sixth embodiment. FIG. 14 is a cross-sectional view taken along the line XIV-XIV of FIG. 13. FIG. 15 is a cross-sectional view taken along the line XV-XV of FIG. 13.

In explanation of the sixth embodiment, a configuration similar to that of the first to fifth embodiments will be marked with the same reference sign, and explanation thereof will be omitted.

According to connection portions 680, 690 of the sixth embodiment, the positions of fastening holes 686, 696 are different compared to the third embodiment. Also, according to the sixth embodiment, opposition portions 682, 692 are longer in the vehicle longitudinal direction than the opposition portions 82, 92.

In the opposition portion 682 of the recessed side connection portion 680, a pair of upper and lower fastening holes 686 is each formed in front of and behind the recessed portion 83.

In the opposition portion 692 of the projected side connection portion 690, a pair of upper and lower fastening holes 696 is each formed in front of and behind the projected portion 93.

The bolt 110 is inserted to the fastening holes 686, 696, and is fastened by the nut 120.

Therefore, the recessed side connection portion 680 and the projected side connection portion 690 are fastened to each other by four pieces fastening. Since fastening is effected by plural number of the bolts 110 and the nuts 120, the anti-loosening measure of the bolt and nut is enabled. Also, a large fastening force can be easily applied, and the expansion collar 300 can be easily enlarged.

As explained above, according to the fifth embodiment, the projected portion 93 and the recessed portion 83 are arranged in the connecting connection portions 680, 690 so as to face each other, the projected portion 93 including the tapered surfaces 95a, the recessed portion 83 receiving the projected portion 93, the inner peripheral wall 85 is formed in the recessed portion 83, and the fastening holes 686 are disposed outside the inner peripheral wall 85 so as to sandwich the recessed portion 83, the pair of front and rear bolts 110 being inserted to the fastening holes 686. Therefore, since one set of the bolts 110 of a front and rear pair are disposed outside the inner peripheral wall 85 so as to sandwich the recessed portion 83 including the inner peripheral wall 85 fitting into the projected portion 93 including the tapered surfaces 95*a* through the expansion collar 300, the fitting pressure of the expansion collar 300 can be increased.

Seventh Embodiment

Figure 16:
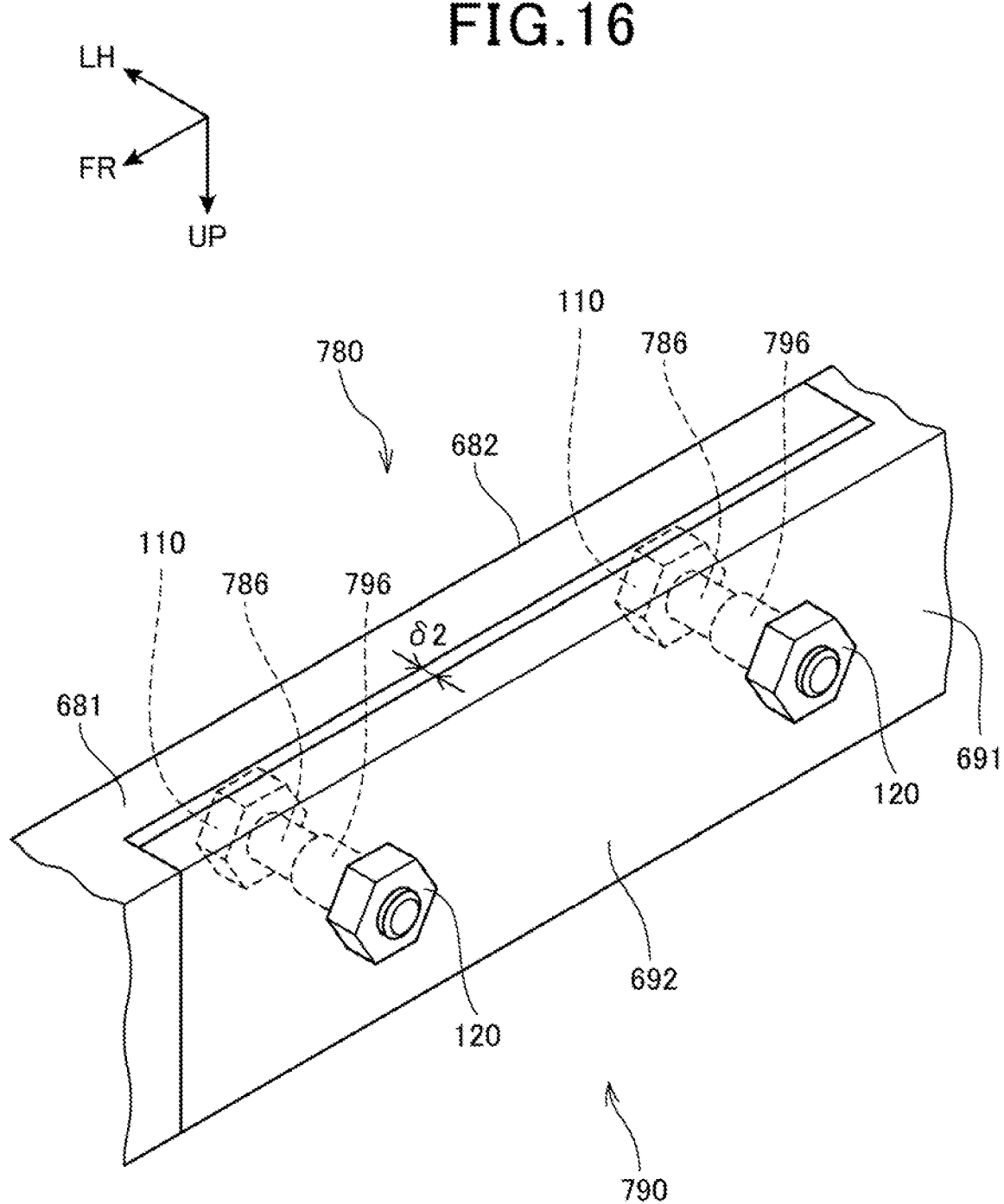
FIG. 16 is a perspective view of a joint portion of the seventh embodiment.

FIG. 16 is a perspective view of a joint portion of the seventh embodiment.

In explanation of the seventh embodiment, a configuration similar to that of the first embodiment will be marked with the same reference sign, and explanation thereof will be omitted.

In connection portions 780, 790 of the seventh embodiment, the positions of fastening holes 786, 796 are different compared to the sixth embodiment. In an opposition portion 682 of the recessed side connection portion 780, in front of and behind the recessed portion 83, one fastening hole 786 each is formed. In an opposition portion 792 of the projected side connection portion 790, in front of and behind the projected portion 93, one fastening hole 796 each is formed. The bolts 110 are inserted to the fastening holes 686, 696, and are fastened by the nuts 120.

Therefore, the recessed side connection portion 780 and the projected side connection portion 790 are fastened to each other by two pieces fastening. The anti-loosening measure and enlargement of the expansion collar 300 are facilitated while reducing the number of pieces of the bolts.

Also, each of the embodiments described above shows an aspect to which the present invention is applied, and the present invention is not limited to each of the embodiments described above.

Although such configuration that the recessed portion 83 and the projected portion 93 had a rectangular shape was explained in the respective embodiments described above, it is also possible to employ other polygonal shapes such as a triangle shape and a pentagonal shape.

Although the embodiments described above were explained exemplifying a four wheeled vehicle as the all terrain vehicle 10, the present invention is not limited to it and can be applied also to a three wheeled saddle riding vehicle including two front wheels or two rear wheels and a saddle riding vehicle including three wheels or more.

REFERENCE SIGNS LIST

51 . . . Center lower frame (frame member)
51*b*, 63*b* . . . Hollow space
63 . . . Connection lower frame (frame member)
80, 680, 780 . . . Recessed side connection portion (connection portion)
90, 690, 790 . . . Projected side connection portion (connection portion)
81*a*, 91*a* . . . Leg portion
83 . . . Recessed portion
85 . . . Inner peripheral wall
85*a* . . . Abutment surface (wall surface)
93 . . . Projected portion
95*a* . . . Tapered surface
96 . . . Fastening hole
100, 200, 300, 500 . . . Expansion collar
104 . . . Large end surface (end surface of the fastening direction)
110 . . . Bolt (fastener)
120 . . . Nut (fastener)
201 . . . Split body
202 . . . Rubber (elastic body)
301, 501 . . . Split body
330 . . . Disk spring (resilient section)
331 . . . Plate spring portion (arc-shape plate spring portion)
332 . . . Open space
430 . . . Hard sponge (resilient section)
530 . . . Coil spring (resilient section)
686, 786 . . . Fastening hole

The invention claimed is:

1. A frame joint connecting connection portions to each other, the connection portions being arranged in frame members of a vehicle, the frame joint comprising:
an inner peripheral wall including wall surfaces arranged in the one connection portion and crossing with each other in the radial direction;
tapered surfaces arranged in the other connection portion and facing the inner peripheral wall;
an expansion collar movable in a radial direction so as to abut on the inner peripheral wall; and
a fastener keeping fitting of the expansion collar in a state where the expansion collar abuts on the inner peripheral wall.

2. The frame joint according to claim 1,
wherein the inner peripheral walls are arranged at least by a pair, and
the expansion collar is disposed so as to face the pair of inner peripheral walls and has a shape of abutting on the wall surfaces in a surface-contact state.

3. The frame joint according to claim 1,
wherein the frame members are tubular bodies including hollow spaces in an inside, and
the connection portions are formed separately from the frame members and includes leg portions inserted to the hollow spaces of the frame members.

4. The frame joint according to claim 1,
wherein a projected portion and a recessed portion are arranged in the connection portions so as to face each other, the projected portion including the tapered surfaces, the recessed portion receiving the projected portion,
the inner peripheral wall is formed in the recessed portion, and
a fastening hole is disposed at a center portion of the projected portion, the fastener being inserted to the fastening hole.

5. The frame joint according to claim 1,
wherein a projected portion and a recessed portion are arranged in the connecting connection portions so as to face each other, the projected portion including the tapered surfaces, the recessed portion receiving the projected portion,
the inner peripheral wall is formed in the recessed portion, and
fastening holes are disposed outside the inner peripheral wall so as to sandwich the recessed portion, a pair of fasteners being inserted to the fastening holes.

6. The frame joint according to claim 1, wherein the expansion collar is configured with a plurality of split bodies, and is formed by connecting the split bodies by an elastic body.

7. The frame joint according to claim 1,
wherein the expansion collar is configured with a plurality of split bodies,
a resilient section is arranged on a fastening direction side end surface of the expansion collar, the resilient section being capable of transmitting an overall energizing force to each of split bodies, and
the expansion collar is energized to an insertion side of the tapered surfaces.

8. The frame joint according to claim 7,
wherein the resilient section is arranged so that a plurality of arc-shape plate spring portions continue in the peripheral direction, the arc-shape plate spring portion including an open space, and
the open space deforms by a force applied to the arc-shape plate spring portion, and a resilient force can transmit to the adjacent arc-shape plate spring portion.

* * * * *